(12) United States Patent
Agarwal et al.

(10) Patent No.: US 8,688,072 B1
(45) Date of Patent: Apr. 1, 2014

(54) AGENT NOTIFICATION TRIGGERED BY NETWORK ACCESS FAILURE

(75) Inventors: Mukesh Agarwal, Wildwood, MO (US); Sarah A. Persson, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 254 days.

(21) Appl. No.: 12/982,481

(22) Filed: Dec. 30, 2010

(51) Int. Cl.
*H04M 11/00* (2006.01)

(52) U.S. Cl.
USPC ...... 455/405; 455/410; 455/411; 379/142.05; 379/126

(58) Field of Classification Search
USPC ............. 455/405, 410–411; 379/142.05, 126, 379/127.1, 142.01
See application file for complete search history.

(56) References Cited

U.S. PATENT DOCUMENTS

| 6,477,370 | B1 * | 11/2002 | Sigler et al. | 455/427 |
| 6,574,730 | B1 * | 6/2003 | Bissell et al. | 713/168 |
| 2003/0153299 | A1 * | 8/2003 | Perfit et al. | 455/410 |
| 2006/0046689 | A1 * | 3/2006 | Kim | 455/406 |
| 2006/0262908 | A1 * | 11/2006 | Chambers et al. | 379/88.01 |
| 2008/0233917 | A1 * | 9/2008 | Liu et al. | 455/406 |
| 2009/0247131 | A1 * | 10/2009 | Champion et al. | 455/411 |
| 2011/0072499 | A1 * | 3/2011 | Lin | 726/6 |

* cited by examiner

*Primary Examiner* — Marcos Torres

(57) ABSTRACT

A method of electronic communication is provided. The method comprises receiving a first call detail record (CDR), where the first call detail record comprises usage information associated with a portable wireless communication device, and the usage information comprises at least a first parameter. Based on the value of the first parameter, a copy of the first call detail record is transmitted to a computer, where the computer does not perform billing functionality. The computer then changes a subscriber account associated with the portable wireless communication device or changes a provisioning associated with the portable wireless communication device.

20 Claims, 7 Drawing Sheets

AGENT NOTIFICATION TRIGGERED BY NETWORK ACCESS FAILURE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones are electronic devices used for mobile voice or data communication based on network connectivity provided by base stations known as cell towers or sites. Electronic devices may be associated with an electronic serial number (ESN), a mobile equipment identifier (MEID), an authorization key, and other identifying information. A call detail record (CDR) is a computer record produced by a telephone exchange or switch containing details of a phone call that passed through the exchange.

SUMMARY

In an embodiment, a method of electronic communication is disclosed. The method comprises receiving a first call detail record (CDR), where the first call detail record comprises usage information associated with a portable wireless communication device, and the usage information comprises at least a first parameter. Based on the value of the first parameter, a copy of the first call detail record is transmitted to a computer, where the computer does not perform billing functionality. The computer then changes a subscriber account associated with the portable wireless communication device or changes a provisioning associated with the portable wireless communication device.

In an embodiment, a method of electronic communication is disclosed. The method comprises determining that a call origination attempt by a portable communication device fails an authentication procedure, where the authentication procedure is based in at least in part on an authentication key. In response to the failed authentication procedure, a note is coupled to a subscriber account associated with the portable wireless communication device, where the note indicates the failed authentication procedure. A call associated with the portable wireless communication device is received by customer care, and in response to the customer care call the note is presented, informing the care agent of the failed authentication procedure.

In an embodiment, a method of electronic communication is disclosed. The method comprises creating a call detail record comprising usage information, where the usage information indicates that a call origination attempt by a portable wireless communication device has failed. Based on the indication of the failed call origination attempt in the usage information, a copy of the call detail record is routed to a communication subscriber account management platform. The subscriber account management platform tags a wireless communication service subscriber account associated with the portable wireless communication device with an indication of the failed call origination attempt.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
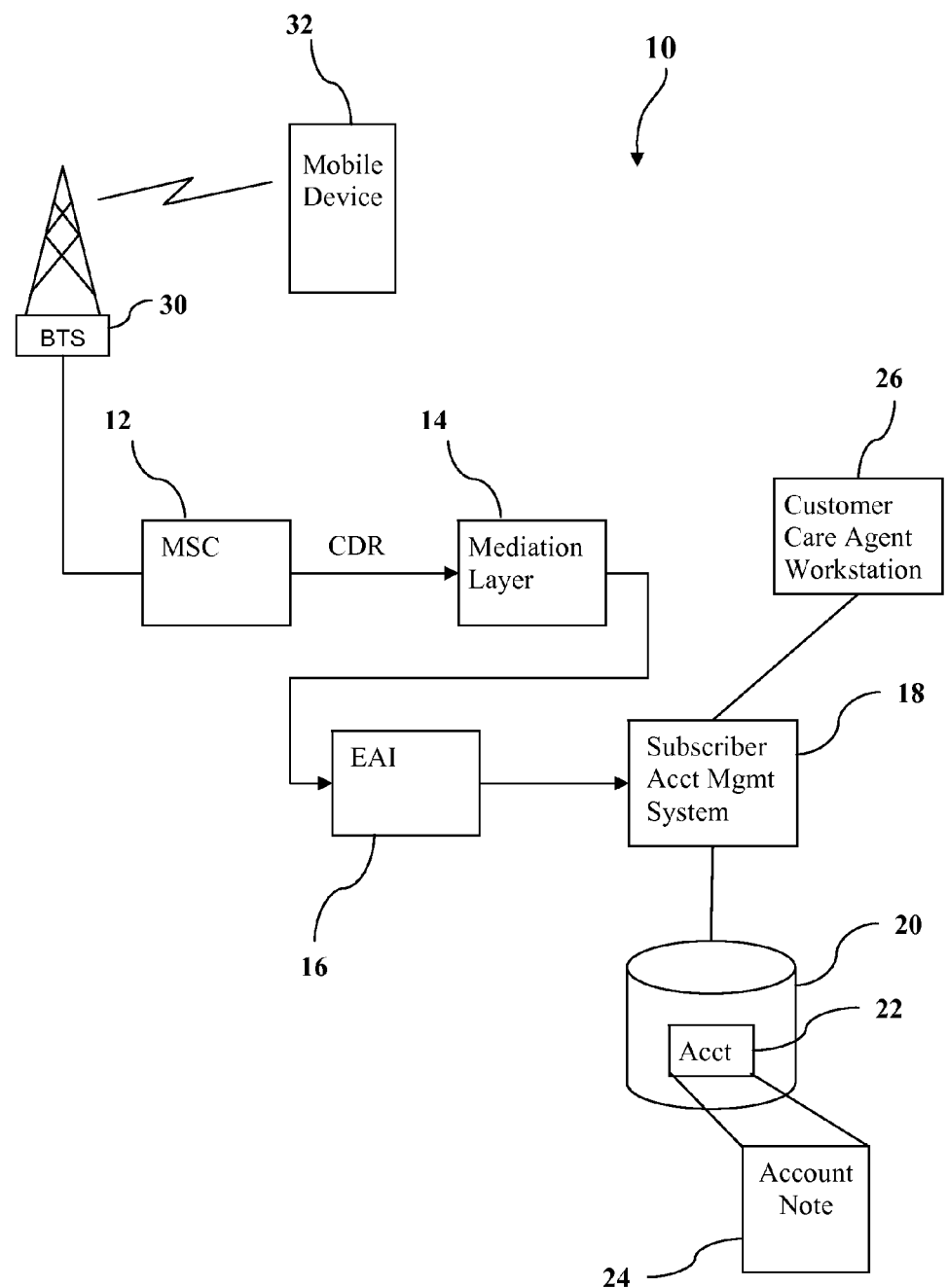
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A method of agent notification triggered by wireless network access failure is described. When a user of a portable wireless communication device attempts to place a call over a wireless service provider's network, the device may first complete a network access authentication process. If the authentication process fails, then the network creates a call detail record (CDR) specifically pertaining to the authentication failure. The authentication failure call detail record is then copied and sent through the wireless network service provider's enterprise computer systems, which direct the call detail record to a subscriber account management system. The subscriber account management system attaches a note about the authentication failure to a subscriber account associated with the device, for example a high priority note. When a customer care agent accesses the subscriber account, for example when receiving a call from the device to receive care, the note is presented notifying the agent of the network access authentication failure for that device, enabling the customer care agent to take steps to address the authentication failure problem. In an embodiment, when the note is a high priority note, displaying the subscriber account automatically causes the note to be displayed and/or presented to the customer care agent.

Call detail records are known to those of skill in the art of telecommunications. Call detail records record information about phone calls and/or data calls. This information may comprise identities of called party and calling party, for example a telephone number of the called party and a telephone number of the calling party. The information may comprise one or more time and date records, for example a time and date of a start of a call, a time and date of an end of a call, a time and a date of another call event. The information may comprise one or more time duration records, for example a time duration of the call. The information may identify one or more communication equipment that are involved in completing the call, for example one or more local exchange switches, one or more mobile switching centers (MSCs), one or more cell towers and/or base transceiver stations, one or more routers, and/or other communication equipment. The information may identify service provider identities, for example when the call is routed over more than one service provider network. Call detail records may comprise yet other information as is known to those of skill in the art.

Call detail records may be created by a variety of devices, including telecommunication switches such as mobile switching centers, local exchange switches, and other switches. Call detail records also may be created by other telecommunications devices and/or equipment. Call detail records are typically sent to billing, rating, and archive applications for use in call accounting and billing. Call detail records may be processed to produce a variety of derivative information, for example bills for subscribers to pay. Call detail records also may be used to support the operations of the wireless network service provider by providing information on faulty calls, network traffic, and network errors. The proposed method describes utilizing call detail records also to provide information to the service provider to enable improved customer support. Although a network access authentication failure is described, a similar process could be used to provide details of other call information or network events to the service provider. Additionally, the subscriber account management system could trigger provisioning or changes to the billing profile of the account as well as adding a note to the account. In an embodiment, the note may be a high priority note.

By utilizing and extending existing systems in place for processing call detail records, the method describes a direct action without additional aggregation or analysis. When it is received, the call detail record flows through the enterprise computer systems of the wireless network provider to the subscriber account management system, as opposed to being aggregated or archived and retrieved via post-processing. This allows the information to reach the customer care organization as promptly as it can be processed by the subscriber account management system.

Turning now to FIG. 1, a communication system 10 is presented. The system comprises a mobile switching center (MSC) 12, a network mediation layer 14, an enterprise application integration (EAI) platform 16, a subscriber account management system 18, a subscriber account data store 20, a customer care agent workstation 26, a base transceiver station (BTS) 30, and a mobile device 32. The subscriber account data store 20 comprises a plurality of subscriber accounts and an account note 24 attached to a first subscriber account 22. The mobile switching center 12 is the primary service delivery node for a cellular wireless network, responsible for call routing and charging. When a portable wireless communication device 32 fails a wireless network access authentication process, the mobile switching center 12 creates an authentication failure call detail record. The mediation layer 14 pulls the authentication failure call detail record from the mobile switching center 12 and, based on the content of the call detail record, determines it is to be routed to the enterprise application integration platform 16. The enterprise application integration platform 16 is a central data broker platform and promotes sharing of data between applications in the enterprise. The enterprise application integration platform 16 may utilize an application programming interface (API) to programmatically transfer the call detail record data to the subscriber account management system 18. The subscriber account management system 18 takes the call detail record data and attaches the account note 24 to the first subscriber account 22 associated with the authentication failure call detail record. In an embodiment, the account note 24 is a high priority note.

The mobile device 32 may be a mobile phone, a personal digital assistant (PDA), a media player, or other communication enabled portable electronic device. The base transceiver station 30 provides a communication link to the mobile device 32 and couples the mobile device 32 to a communication network, for example any of a data network, a voice network, a private network, a public network, the Internet, and/or a combination of these networks. The base transceiver station 30 provides a wireless communication link to the mobile device 32 according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless protocol. While a single base transceiver station 30 is illustrated in FIG. 1, it is understood that the communication system 10 may comprise any number of base transceiver stations 30 and any number of mobile devices 32.

The nodes are shown coupled to each other in FIG. 1 to clearly illustrate the call detail record flow through a communication network but it is understood that one or more communication links and network nodes (not shown) may be located in the coupling path. The network nodes shown could alternatively be illustrated coupled to a network cloud, thereby abstracting the specific communication links and paths between the nodes. The communication between the nodes may be provided by one or more of private networks, public networks, the internet, voice network, and/or data network.

Figure 2:
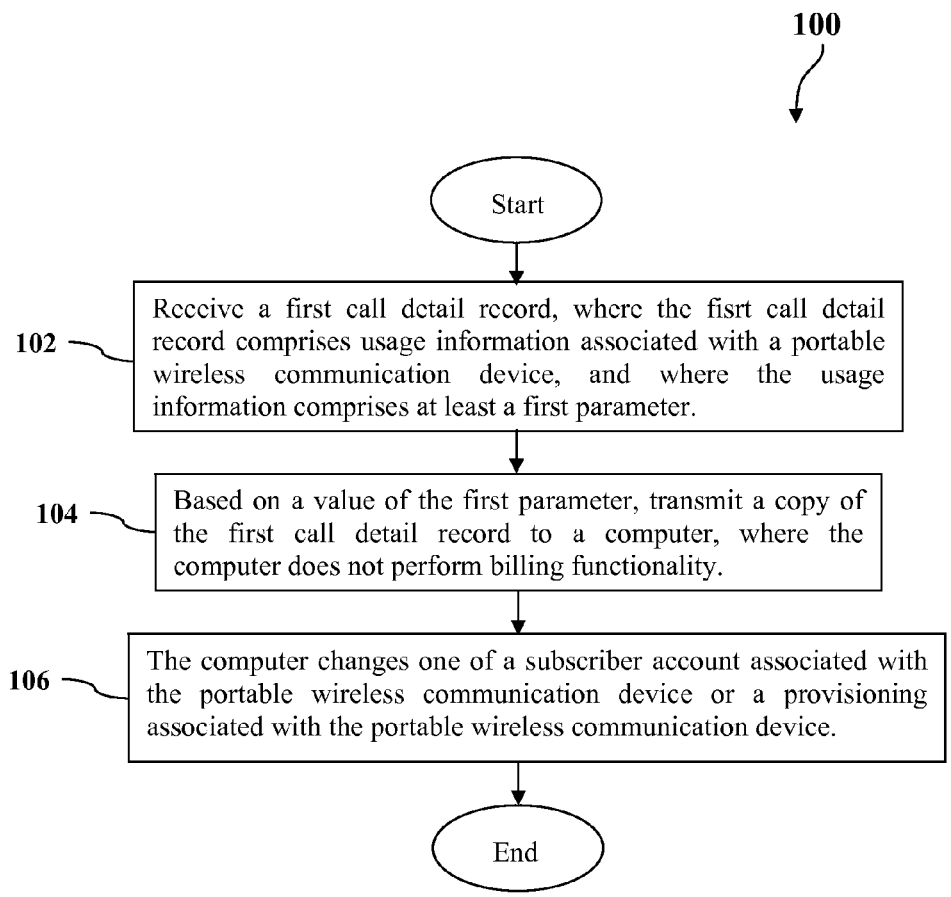
FIG. 2 is a flow chart of a method according to an embodiment of the disclosure.

Turning now to FIG. 2, a method 100 is described. At block 102, a first call detail record is received, where the first call detail record comprises usage information associated with a portable wireless communication device, and where the usage information comprises at least a first parameter. At block 104, based on a value of the first parameter, a copy of the first call detail record is transmitted to a computer, where the computer does not perform billing functionality. While a call detail record is typically used for call accounting and billing, the method 100 describes presenting the call detail record to a computer performing separate functionality. At block 106, the computer changes a subscriber account 22 associated with the portable wireless communication device 32 and/or changes a provisioning associated with the portable wireless communication device 32. For example, the computer could make changes to a billing profile for a customer account 22, trigger provisioning changes on the account 22, or add a note 24 to the account 22 for reference.

In an embodiment, the first parameter indicates that the portable wireless communication device 32 failed an authentication procedure during a call origination attempt. The authentication failure prevents the portable wireless communication device 32 from accessing the wireless network. The call which the portable wireless communication device 32 was attempting when the authentication failure occurred may instead be routed directly to a dedicated customer care group trained in authentication issues. In an embodiment, the computer changes the subscriber account 22 by coupling a note 24 to the account 22 indicating the failed authentication. The note 24 will allow a customer care agent to be aware of the authentication failure when reviewing the account 22. In an embodiment, the method 100 further comprises a customer care application presenting the note 24 during a subsequent customer care call associated with the portable wireless communication device 32, which could occur at a later time. For example, when the note 24 is a high priority note, the customer care application may automatically present the note 24 when the associated subscriber account 22 is accessed.

For example, a portable wireless communication device 32 user attempts to originate a call on a wireless network. The portable wireless communication device 32 fails an authentication procedure and the call is routed directly to a customer care agent specifically trained in this type of authentication failure. The portable wireless communication device 32 user, upon hearing the call arrive somewhere other than the intended called party, may hang up and attempt the call again. The second attempted call also may fail authentication, and the portable wireless communication device 32 user may decide to wait and report the problem to customer care at a later time.

When calling at this later time to report the failure, the customer care call likely may be directed to a non-specialized agent who may have a hard time troubleshooting the problem without the contextual information of the authentication failure details. By coupling a note 24 to the subscriber account 22, the method 100 addresses this case of a non-specialized customer care agent receiving the call. When the subscriber account 22 is accessed on a customer care agent workstation 26, the account note 24 will be presented to the non-specialized care agent, who will have the option of forwarding the call to a customer care agent specifically trained in this type of authentication failure or of handling the call himself based on the knowledge of the authentication failure identified by the account note 24. In an embodiment, the customer care system may automatically access the associated subscriber account information as a customer care call is received, and the customer care system may automatically route the subject care call based on the presence of the account note 24 to a care agent specifically trained in this type of authentication failure.

Routing a customer care call from a device that has failed authentication to a customer care agent trained in authentication failures not only promotes efficient resolution of network access issues for legitimate wireless network subscribers, but also may help handle authentication failures caused by users attempting fraud by accessing the wireless network without subscribing to the network and without paying for service from the wireless service provider. Fraudulent users may be attempting to access the network on portable wireless communication devices 32 that have been stolen or using credentials copied from a legitimate wireless network subscriber and may be willing to lie to the customer care agent to attempt to have access to the wireless network granted to the portable wireless communication device 32. A customer care agent trained in authentication failures also may receive training in identifying and dealing with potentially fraudulent callers. Another example where specific training may be employed by a customer care agent dealing with authentication failures is the case where the authentication key for a portable wireless communication device is wrong or corrupted even though the user is a subscriber of the wireless network service provider. The customer care agent may be able to provide a temporary workaround to allow network access to the portable wireless communication device 32 until the subscriber can bring the device to a retail store to be repaired or exchanged.

In an embodiment, the method 100 further describes receiving a second call detail record, where the second call detail record comprises usage information associated with a portable wireless communication device 32. The usage information comprises at least a second parameter, where the second parameter provides a roaming indication. Based on a value of the second parameter, a copy of the second call detail record is transmitted to a computer, where the computer does not perform billing functionality, and the computer sends wireless communication service promotional information to the portable wireless communication device 32. For example, the wireless communication service provider may send a message to the portable wireless communication device 32 roaming on their wireless network which promotes new phones and wireless plans and provides the location of their closest retail store. In an embodiment, the portable wireless communication device is one of a mobile phone, a personal digital assistant (PDA), and a media player.

Figure 3:
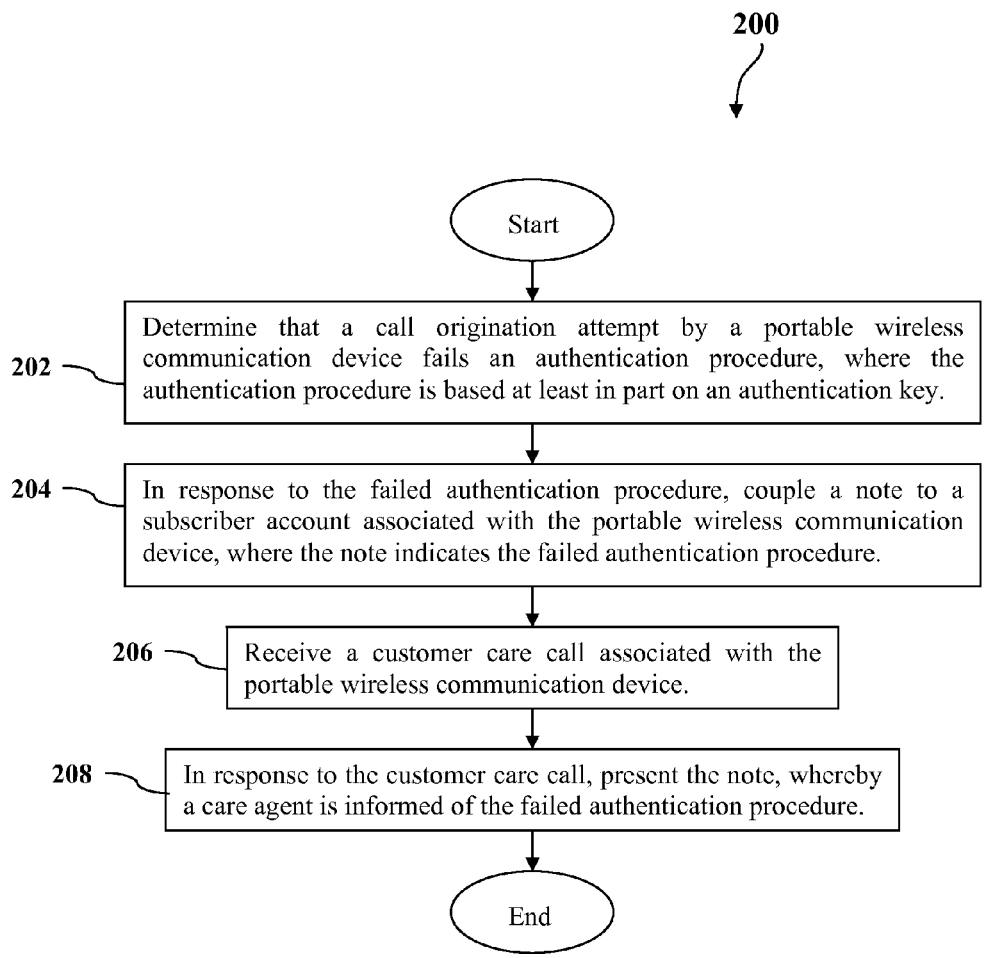
FIG. 3 is a flow chart of a method according to an embodiment of the disclosure.

In FIG. 3, a method 200 is described. At block 202, a determination is made that a call origination attempt by a portable wireless communication device 32 fails an authentication procedure, where the authentication procedure is based at least in part on an authentication key. An authentication key is a piece of data used as at least part of a shared secret data between the portable wireless communication device and the wireless network switch. At block 204, in response to the failed authentication procedure, a note 24 is coupled to a subscriber account 22 associated with the portable wireless communication device 32, where the note 24 indicates the failed authentication procedure. The failed authentication procedure signifies a failed attempt to access a wireless network, and a wireless communication service provider may attach a note 24 to the subscriber account associated with the portable wireless communication device 32. The portable wireless communication device 32 user may call customer care later for assistance to successfully connect to the network, and the note 24 will serve as a reference on the subscriber account 22 to help identify the reason the portable wireless communication device 32 is unable to access the wireless network. At block 206, a customer care call associated with the portable wireless communication device 32 is received. At block 208, in response to the customer care call, the note 24 is presented to a care agent, informing the care agent of the failed authentication procedure. If the portable wireless communication device 32 user calls customer care to report an issue with the portable wireless communication device 32, the customer care agent will bring up the account 22 information associated with the portable wireless communication device 32 on a customer care agent workstation 26, and immediately will be presented with the note 24 and the detail of the failed authentication procedure. This promotes the customer care agent determining what is preventing the device from accessing the wireless network and resolving the problem.

In an embodiment, the authentication key is a 20 character key. In an embodiment, the authentication procedure is based on processing the authentication key and an electronic serial number (ESN) and/or a mobile equipment identifier (MEID) of the portable wireless communication device 32. The authentication key and electronic serial number or mobile equipment identifier are run through an algorithm on the portable wireless communication device 32 and the wireless network switch during registration to the wireless network. The portable wireless communication device 32 provides the processed result of the algorithm to the wireless network. The network switch also computes a result based on an algorithm and device data stored on the switch, and compares the computed result to the result received from the portable wireless communication device 32. A failed comparison means an authentication failure call detail record is generated and the portable wireless communication device 32 is not granted network access.

In an embodiment, the method 200 further generates a call detail record comprising a parameter having a value indicating the failed authentication procedure and sends a copy of the call detail record to a non-billing system based on the parameter value. The non-billing system couples a note 24 to the subscriber account 22 describing the authentication failure. In an embodiment, the call detail record is generated by a mobile switching center (MSC). In an embodiment, the mobile switching center sends the call detail record to a mediation layer application and the mediation layer application makes a copy of the call detail record and sends the call detail record to the non-billing system. In an embodiment, the method 200 further comprises sending the call detail record to a logging system.

Figure 4:
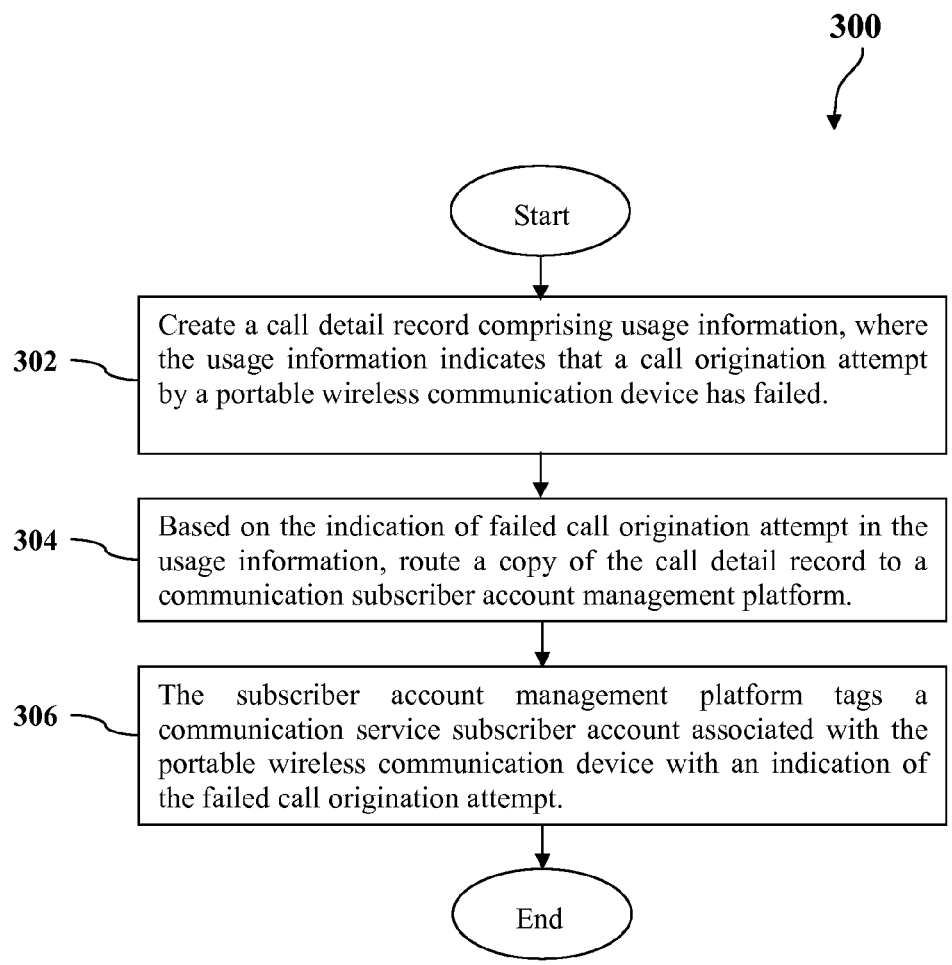
FIG. 4 is a flow chart of a method according to an embodiment of the disclosure.

Turning now to FIG. 4, a method 300 is described. At block 302, a call detail record comprising usage information is created, where the usage information indicates that a call origination attempt by a first portable wireless communication device 32 has failed. At block 304, based on the indication of the failed call origination attempt in the usage information, a copy of the call detail record is routed to a communication subscriber account management platform 18. Sending the call detail record to the subscriber account management platform 18 allows the wireless service provider to utilize the failure information outside of the traditional billing and network management functions.

At block 306, the subscriber account management platform 18 tags a communication service subscriber account 22 associated with the first portable wireless communication device 32 with an indication of the failed call origination attempt. By tagging the subscriber account 22 with an indication of the failed call origination attempt, the service provider takes advantage of usage information normally utilized for managing the communication network and creates added value in the subscriber account management area. Tagging may include adding a note 24 to the subscriber account or inserting a reference to the usage information which points the customer care agent to a location in another system where the information about the failed authorization and/or failed call origination attempt is stored. Additional data attached to the subscriber account 22 provides the ability to give improved, more efficient customer support. In an embodiment, the method 300 further comprises receiving a call to customer care associated with the first portable wireless communication device 32 in a call center and distributing the call to a customer care agent. The customer care agent accesses the wireless communication service subscriber account 22 and is presented the indication of the failed call origination attempt.

In an embodiment, the copy of the call detail record is routed to the communication subscriber account management platform 18 directly. No post-processing of the call detail record data is done by the subscriber account management platform 18, and the copy of the call detail record is sent directly to the subscriber account management platform 18 and is processed as it is received. In an embodiment, a message acquisition formatter (MAF) routes the copy of the call detail record to the communication subscriber account management platform 18. In an embodiment, the message acquisition formatter routes the copy of the call detail record to the communication subscriber account management platform 18 via an enterprise application integration (EAI) platform 16. Enterprise application integration is the use of software and computer systems architectural principles to integrate a set of enterprise computer applications, allowing exchange of data between systems such as the message acquisition formatter, the billing system, and the subscriber account management platform. In an embodiment, the communication subscriber account management platform 18 is an Amdocs platform. Amdocs is a provider of software and services for billing, customer relationship management, and operations support systems to communications providers. Ensemble is the Amdocs platform for customer care, billing, and order management.

In an embodiment, the subscriber account management platform 18 tags the wireless communication service provider account 22 associated with the first portable wireless device 32 within a day's time of creation of the call detail record, typically within an hour's time of creation of the call detail record. The copy of the call detail record may have to pass through a plurality of corporate computer systems to reach the subscriber account management platform 18. While the call detail record may be processed as it is received by these corporate computer systems, it may have a lower priority than other tasks and therefore take some time for the subscriber account management platform 18 to tag the subscriber account 22, the tag typically occurs within a day's time of the creation of the call detail record.

Figure 5:
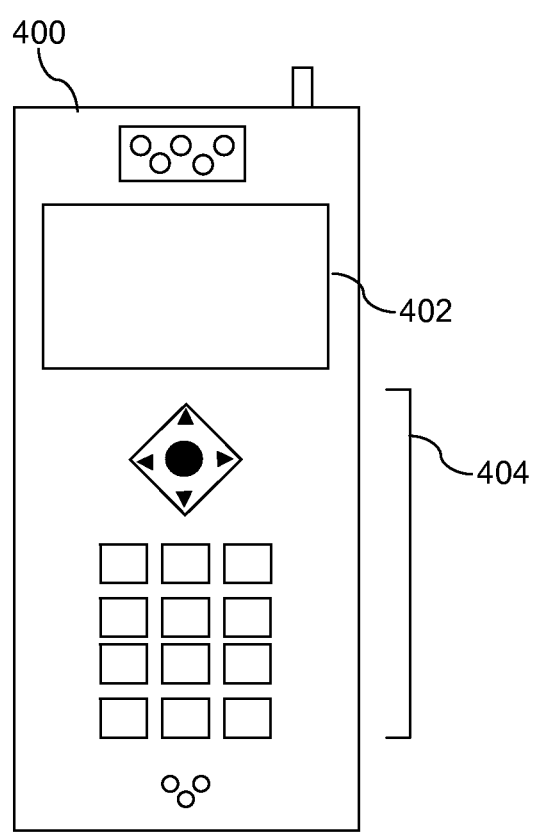
FIG. 5 is an illustration of a mobile device according to an embodiment of the disclosure.

FIG. 5 shows a wireless communications system including the mobile device 400. FIG. 5 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 400 is not a general purpose computing device like a portable, laptop or tablet computer, but rather is a special-purpose communications device such as a mobile phone, wireless handset, pager, or PDA. The mobile device 400 may support specialized activities such as gaming, inventory control, job control, and/or task management functions, and so on.

The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400.

Figure 6:
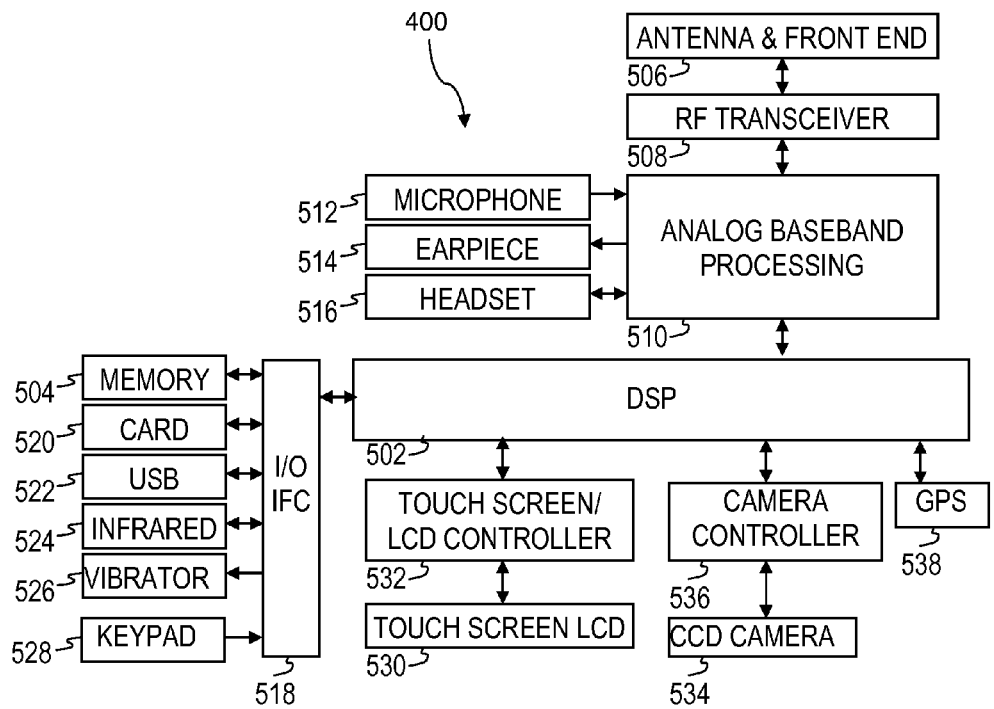
FIG. 6 is a block diagram of a mobile device according to an embodiment of the disclosure.

FIG. 6 shows a block diagram of the mobile device 400. While a variety of known components of handsets 400 are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 400 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 400 to send and receive information from a radio access network (RAN) or some other available wireless communications network or from a peer mobile device 400. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 400 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The input/output interface 518 may further connect the DSP 502 to the vibrator 526 that, when triggered, causes the mobile device 400 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530.

The CCD camera 534 enables the mobile device 400 to take digital pictures. The DSP 502 communicates with the CCD camera 534 via the camera controller 536. The GPS sensor 538 is coupled to the DSP 502 to decode global positioning system signals, thereby enabling the mobile device 400 to determine its position. In another embodiment, a camera operating according to a technology other than charge coupled device cameras may be employed. Various other peripherals may also be included to provide additional functions, e.g., radio and television reception.

Figure 7:
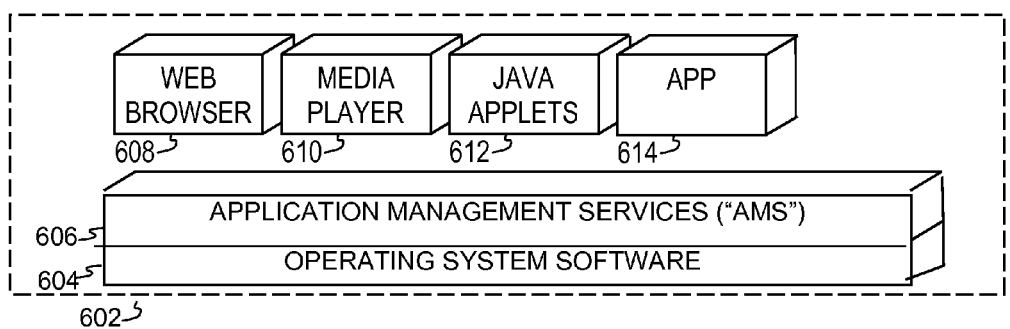
FIG. 7 is a block diagram of a software architecture for a mobile device according to an embodiment of the disclosure.

FIG. 7 illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the mobile device 400. Also shown in FIG. 6 are a web browser application 608, a media player application 610, and JAVA applets 612. The web browser application 608 configures the mobile device 400 to operate as a web browser, allowing a user to enter information into forms and select links to retrieve and view web pages. The media player application 610 configures the mobile device 400 to retrieve and play audio or audiovisual media. The JAVA applets 612 configure the mobile device 400 to provide games, utilities, and other functionality.

Figure 8:
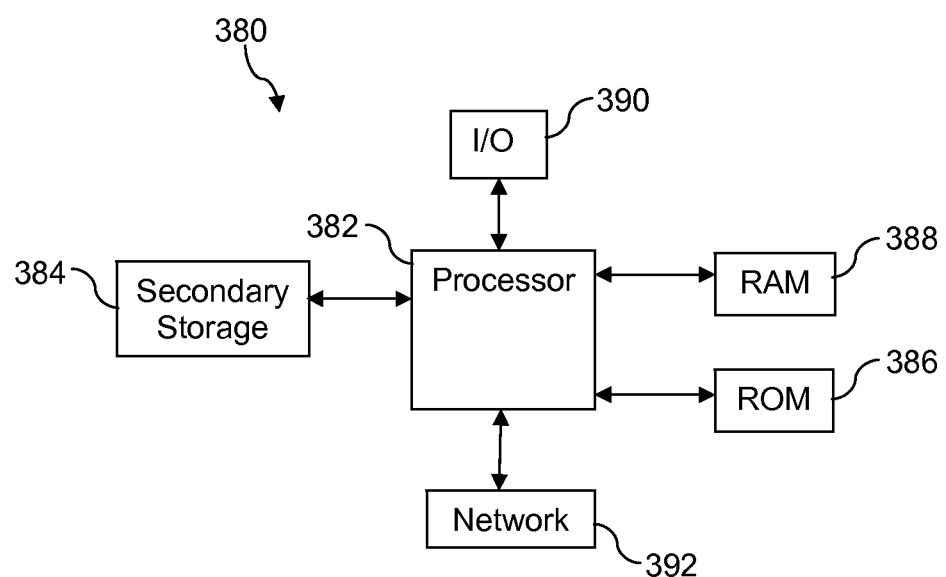
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, a baseband signal and/or a signal embodied in a carrier wave may be referred to as a transitory signal. In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of using call detail records, comprising:
 creating a plurality of call detail records in response to network access authentication process attempts, wherein the plurality of call detail records are sent to an application related to at least one of call accounting or billing;
 identifying a call detail record of the plurality of call detail records related to a failed network access authentication process attempt by a portable wireless communication device attempting to place a call;
 copying the call detail record related to the failed network access authentication process attempt;
 transmitting the copy of the call detail record to a subscriber account management system, wherein the subscriber account management system is a non-billing and non-call accounting system;
 receiving, by the subscriber account management system, the copy of the call detail record;
 creating, by the subscriber account management system, a note indicating the failed network access authentication process attempt in response to receiving the copy of the call detail record;

attaching, by the subscriber account management system, the note to a subscriber account associated with the portable wireless communication device; and presenting, by the subscriber account management system, the note to a customer care agent during a customer care call associated with the portable wireless communication device to notify the customer care agent of the failed network access authentication process attempt.

2. The method of claim 1, further comprising routing the attempted call to the customer care agent upon the portable wireless communication device's failure to complete the network access authentication process.

3. The method of claim 1, further comprising:
routing the customer care call subsequently placed by the portable wireless communication device to the customer care agent based on the note attached to the subscriber account.

4. The method of claim 3, wherein the note is automatically presented to the customer care agent during the customer care call associated with the portable wireless communication device.

5. The method of claim 1, further comprising:
receiving, by the subscriber account management system, a copy of another call detail record comprising a roaming indication; and
sending, by the subscriber account management system, wireless communication service promotional information to the portable wireless communication device based on the copy of the other call detail record.

6. The method of claim 1, wherein the portable wireless communication device is one of a mobile phone, a personal digital assistant (PDA), and a media player.

7. A method of using call detail records comprising:
creating a plurality of call detail records in response to network access authentication process attempts, wherein the plurality of call detail records are sent to an application related to at least one of call accounting or billing;
identifying a call detail record of the plurality of call detail records related to a failed authentication procedure by a portable wireless communication device attempting to place a call, wherein the authentication procedure is based at least in part on an authentication key;
copying the call detail record related to the failed authentication procedure;
sending a copy of the call detail record to a subscriber account management system, wherein the subscriber account management system is a non-billing and non-call accounting system;
creating, by the subscriber account management system, a note indicating the portable wireless communication device's failed authentication procedure in response receiving the copy of the call detail record;
coupling, by the subscriber account management system, the note to a subscriber account associated with the portable wireless communication device;
receiving a customer care call associated with the portable wireless communication device; and
presenting, by the subscriber account management system, the note to a customer care agent in response to the customer care call, wherein the presenting notifies the customer care agent of the failed authentication procedure.

8. The method of claim 7, wherein the authentication key is a 20 character key.

9. The method of claim 7, wherein the authentication procedure is based on processing the authentication key and one of an electronic serial number (ESN) or a mobile equipment identifier (MEID) of the portable wireless communication device.

10. The method of claim 7, wherein the call detail record comprises a parameter having a value indicating the failed authentication procedure, and wherein the sending of the call detail record by the network is based on the value of the parameter.

11. The method of claim 10, wherein the call detail record is generated by a mobile switching center (MSC).

12. The method of claim 11, wherein the mobile switching center sends the call detail record to an application and the application makes a copy of the call detail record and sends the call detail record to the non-billing system.

13. The method of claim 7, further comprising sending the call detail record to a logging system.

14. A method of using call detail records, comprising:
creating a plurality of call detail records in response to call origination attempts, wherein the plurality of call detail records are sent to an application related to at least one of call accounting or billing;
identifying a call detail record of the plurality of call detail records related to a failed call origination attempt by a portable wireless communication device, wherein the call detail record comprises usage information indicating that the call origination attempt by the portable wireless communication device has failed;
copying the call detail record related to the failed call origination attempt;
routing the copy of the call detail record to a communication subscriber account management platform based on the usage information indicating the failed call origination attempt, wherein the subscriber account management system is a non-billing and non-call accounting system;
receiving, by the subscriber account management platform, the copy of the call detail record;
creating, by the subscriber account management system, a note indicating the portable wireless communication device's failed origination attempt in response to receiving the copy of the call detail record;
attaching, by the subscriber account management system, the note to a wireless communication service subscriber account associated with the portable wireless communication device, wherein the note comprises an indication of the failed call origination attempt.

15. The method of claim 14, further comprising:
receiving a customer care call associated with the portable wireless communication device in a call center;
distributing the customer care call to a care agent;
accessing the wireless communication service subscriber account; and
presenting the note comprising the indication of the failed call origination attempt to the care agent.

16. The method of claim 14, wherein the copy of the call detail record is routed to the communication subscriber account management system directly.

17. The method of claim 14, wherein the subscriber account management platform attaches the note to the wireless communication service provider account associated with the portable wireless communication device within a day's time of creation of the call detail record.

18. The method of claim 14, wherein a message acquisition formatter (MAF) routes the copy of the call detail record to the communication subscriber account management platform.

19. The method of claim 18, wherein the message acquisition formatter routes the copy of the call detail record to the communication subscriber account management platform via an enterprise application integration (EAI) platform.

20. The method of claim 14, wherein the communication subscriber account management platform is an Amdocs platform.

* * * * *